(12) United States Patent
Zhou et al.

(10) Patent No.: US 9,901,846 B2
(45) Date of Patent: Feb. 27, 2018

(54) ENERGY EFFICIENT SOLVENT REGENERATION PROCESS FOR CARBON DIOXIDE CAPTURE

(71) Applicants: Shaojun Zhou, Palatine, IL (US); Howard S. Meyer, Hoffman Estates, IL (US); Shiguang Li, Mount Prospect, IL (US)

(72) Inventors: Shaojun Zhou, Palatine, IL (US); Howard S. Meyer, Hoffman Estates, IL (US); Shiguang Li, Mount Prospect, IL (US)

(73) Assignee: Gas Technology Institute, Des Plaines, IL (US)

( * ) Notice: Subject to any disclaimer, the term of this patent is extended or adjusted under 35 U.S.C. 154(b) by 441 days.

(21) Appl. No.: 14/549,954

(22) Filed: Nov. 21, 2014

(65) Prior Publication Data

US 2016/0144295 A1 May 26, 2016

(51) Int. Cl.
*B01D 19/00* (2006.01)
*B01D 53/14* (2006.01)

(52) U.S. Cl.
CPC ..... *B01D 19/0036* (2013.01); *B01D 53/1425* (2013.01); *B01D 53/1475* (2013.01); *B01D 2252/10* (2013.01); *B01D 2252/102* (2013.01); *B01D 2252/204* (2013.01); *B01D 2257/504* (2013.01); *Y02C 10/06* (2013.01)

(58) Field of Classification Search
CPC ............ B01D 19/0036; B01D 2252/10; B01D 2252/102; B01D 2252/204; B01D 2257/504; B01D 53/1425; B01D 53/1475; Y02C 10/06

See application file for complete search history.

(56) References Cited

U.S. PATENT DOCUMENTS

| | | | | |
|---|---|---|---|---|
| 2,826,266 A | * | 3/1958 | Hachmuth | ......... B01D 53/1475 62/635 |
| 5,061,465 A | | 10/1991 | Carter | |
| 2010/0154637 A1 | * | 6/2010 | Capdeville | ......... B01D 53/1462 95/174 |
| 2011/0203314 A1 | * | 8/2011 | Mak | ................... B01D 53/1425 62/617 |
| 2012/0227440 A1 | * | 9/2012 | Guidati | .............. B01D 53/1425 62/617 |

FOREIGN PATENT DOCUMENTS

| | | |
|---|---|---|
| CA | 2 800 745 | 12/2011 |
| WO | WO 2009/158064 | 12/2009 |
| WO | WO 2010/039785 | 4/2010 |
| WO | WO 2011/034993 | 3/2011 |
| WO | WO 2012/120370 | 9/2012 |

* cited by examiner

Primary Examiner — Cabrena Holecek
(74) Attorney, Agent, or Firm — Pauley Erickson & Kottis

(57) ABSTRACT

A process for removing carbon dioxide from a carbon dioxide-loaded solvent uses two stages of flash apparatus. Carbon dioxide is flashed from the solvent at a higher temperature and pressure in the first stage, and a lower temperature and pressure in the second stage, and is fed to a multi-stage compression train for high pressure liquefaction. Because some of the carbon dioxide fed to the compression train is already under pressure, less energy is required to further compress the carbon dioxide to a liquid state, compared to conventional processes.

20 Claims, 1 Drawing Sheet

ENERGY EFFICIENT SOLVENT REGENERATION PROCESS FOR CARBON DIOXIDE CAPTURE

This invention was made with government support under Contract No. DE-FE 0012829 awarded by the United States Department of Energy. The government has certain rights in the invention.

FIELD OF THE INVENTION

This invention is directed to an energy-efficient process for removing carbon dioxide from a carbon dioxide-loaded solvent, thereby regenerating the solvent.

BACKGROUND OF THE INVENTION

Numerous chemical and industrial processes produce fluid streams loaded with acid gases. Removal of the acid gas is typically required to meet environmental regulations and/or to meet the requirements of downstream processes. Current processes for removing acid gases include countercurrent absorption by a regenerative solvent in an absorber column where the acid gas flows upward and the liquid absorbing regenerative solvent flows downward. The acid gas-rich liquid solvent leaving the bottom of the absorber is sent to a desorber via a cross heat exchanger where it gets heated. In the packed- or trayed-column desorber, acid gases are stripped away from the rich solution by contacting it with steam in a counter current direction. A part of the acid gas-lean solution from the bottom of the desorber circulates through a reboiler where auxiliary steam is utilized to partially vaporize the amine solution which, upon steam condensation in the desorber provides the heat needed for amine regeneration to release acid gas. The water saturated hot acid gas stream leaving the top of the desorber is cooled to collect condensed water. The acid gas residue is preferred to be compressed for high-pressure storage in order to prevent the release of large quantities of acid gas into the atmosphere.

Regenerative liquid solvents include, for example, chemical solvents such as primary, secondary and tertiary amines and potassium carbonate, and physical solvents such as DEPG or dimethyl ether polyethylene glycol (Selexol™ or Coastal AGR®), NMP or N-methyl-2-pyrrolidone (Purisol®), methanol (Rectisol®), morpholine derivatives (Morphysorb®) and propylene carbonate (Fluor Solvent™). The Shell Sulfinol® process is a hybrid process using a combination of a physical solvent, sulfolane, and a chemical solvent, diisopropanolamine (DIPA) or methyl diethanolamine (MDEA). The physical solvent and one of the chemical solvents each make up about 35 to 45% of the solution with the balance being water. Acid gases include, for example, carbon dioxide, hydrogen sulfide, sulfur dioxide, carbon disulfide, hydrogen cyanide and carbonyl sulfide. The process of capturing waste carbon dioxide from large point sources, such as fossil fuel power plants are of the greatest interest because of the concern to climate change due to the emission of $CO_2$. The amount of $CO_2$ produced from the combustion of fossil fuels in the US is expected to increase 3.2% from approximately 5.6 to 5.8 billion metric tons from 2012 to 2035, with over 30% of the $CO_2$ produced from the coal-fired electric power sector. Therefore, to address concerns about global climate change and to reduce US greenhouse gas emissions of 17% by 2020 and 83% by 2050 from a 2005 baseline, the federal legislation targeting coal-fired power plants is likely. Moreover, the cost of recovering carbon dioxide is quite high for conventional processes, due to the high energy consumption required for the follow-up compression processes in which the carbon dioxide must be compressed and liquefied from a starting pressure that is only slightly higher than ambient pressure.

There is a need or desire for an effective, more cost-efficient way of removing carbon dioxide from a carbon dioxide-loaded solvent in conjunction with follow-up carbon dioxide compression process that reduces the overall energy required.

SUMMARY OF THE INVENTION

The invention is directed to a process for removing carbon dioxide from a carbon dioxide-loaded solvent having a first carbon dioxide content. The process includes the steps of heating the carbon dioxide-loaded solvent to a first temperature and applying a first pressure to the carbon dioxide-loaded solvent; feeding the carbon dioxide-loaded solvent to a first stage high-temperature and high pressure flash apparatus; flashing carbon dioxide from the carbon dioxide-loaded solvent in the first stage flash apparatus to yield a first treated solvent having a second carbon dioxide content that is lower than the first carbon dioxide content and a first carbon dioxide-containing gas stream; and removing the first carbon dioxide-containing gas stream from the first stage flash apparatus. The process also includes the steps of feeding the first treated solvent to a second stage flash apparatus at a second temperature that is lower than the first temperature and a second pressure that is lower than the first pressure; flashing carbon dioxide from the first treated solvent in the second stage flash apparatus to yield a second treated solvent having a third carbon dioxide content that is lower than the second carbon dioxide content and a second carbon dioxide-containing gas stream; removing the second carbon dioxide-containing gas stream from the second stage flash apparatus; and removing the second treated solvent from the second stage flash apparatus.

Stated more succinctly, the process of the invention includes the steps of flashing carbon dioxide from the carbon dioxide-loaded solvent in a first stage flash apparatus to yield a first treated solvent having a second carbon dioxide content that is lower than the first carbon dioxide content; and flashing carbon dioxide from the first treated solvent in a second stage flash apparatus to yield a second treated solvent having a third carbon dioxide content that is lower than the second carbon dioxide content.

With the foregoing in mind, it is a feature and advantage of the invention to provide an effective, efficient process for solvent regeneration (e.g. removing carbon dioxide from a carbon dioxide-loaded solvent) and follow-up compression to high pressure. The foregoing and other features and advantages will become further apparent from the following detailed description of the invention, read in conjunction with the drawings.

DETAILED DESCRIPTION OF THE INVENTION

Figure 1:
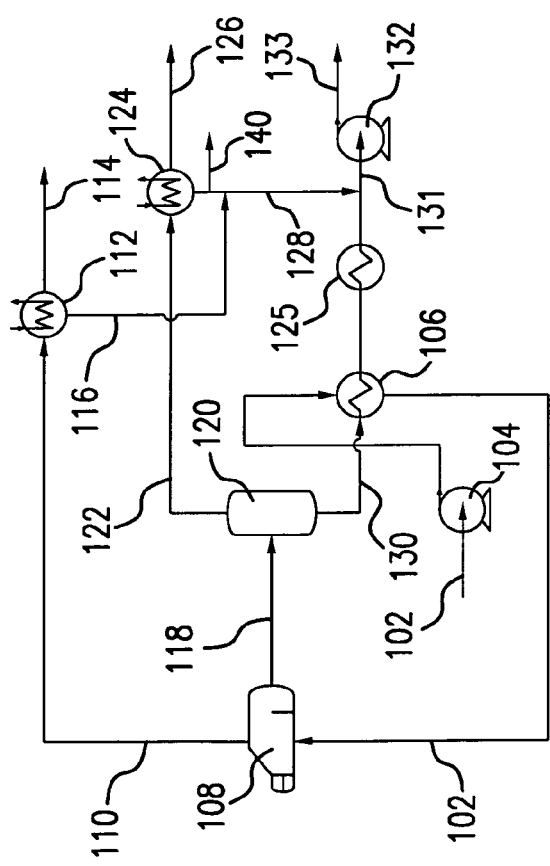
FIG. 1 schematically illustrates a two-stage solvent regeneration process according to the invention.

Referring to FIG. 1, a two-stage solvent regeneration process 100 is shown for removing carbon dioxide from a carbon dioxide-loaded solvent. A carbon dioxide-loaded solvent stream 102 is pressurized using pump 104 and heated using heat exchanger 106 and is then fed to a first stage flash apparatus 108. The first pressure is suitably at least about four atmospheres, or at least about eight atmospheres, or at least about ten atmospheres. The first temperature is suitably at least about 125° C., or at least about 135° C., or at least about 145° C. The first stage flash apparatus can be a once-through reboiler or another suitable flash apparatus with heating elements.

The carbon dioxide-loaded solvent stream 102 can have a first carbon dioxide content (prior to any carbon dioxide removal) in a range of about 1-12% by weight, suitably at least about 8% by weight, and can be higher or lower depending on the specific solvent and the specific application. Suitable solvents include without limitation aqueous ammonia, amine-based solvents such as monoethanolamines, diethanolamines and triethanolamines, aqueous potassium carbonate, and other known solvents. One suitable solvent is activated N-methyl diethanolamine ("aMDEA"), which contains piperazine activating agent.

Carbon dioxide is flashed from the carbon dioxide-loaded solvent in the first stage flash apparatus 108 to yield a first treated solvent having a second carbon dioxide content that is lower than the first carbon dioxide content and a first carbon dioxide-containing gas stream. The first carbon dioxide-containing gas stream 110 exits the first stage flash apparatus 108 and is fed to a condenser 112 that condenses the water vapor and separates it from the carbon dioxide gas. The carbon dioxide gas stream 114 exits the condenser 112 and can be fed to the suction side of the second or third compression stage of a multi-stage compression train as explained blow. The condensed water stream 116 exits the condenser 112 and is combined with the condensed water stream 128 described below. The first treated solvent stream 118 exits the first stage flash apparatus 108 and is fed to the second stage flash apparatus 120 at a second temperature that is lower than the first temperature and a second pressure that is lower than the first pressure.

The first treated solvent has a second carbon dioxide content that is lower than the first carbon dioxide content and is suitably at least about 30% lower, or at least about 50% lower, or at least about 75% lower than the first carbon dioxide content. By way of example, when the first carbon dioxide content is about 8-12% by weight, the second carbon dioxide content can be about 6% or less by weight, or about 4% or less by weight, or about 2% or less by weight. The second temperature is suitably at least about 5° C. less than the first temperature, or at least about 15° C. less than the first temperature, or at least about 25° C. less than the first temperature, and is suitably not more than about 130° C., or not more than about 120° C., or not more than about 110° C. The second pressure is suitably at least about 50% less than the first pressure, or at least about 60% less than the first pressure, or at least about 75% less than the first pressure, with all pressures described herein measured on an absolute basis. For example, when the first pressure is about 6-10 atmospheres, the second pressure is suitably not more than about three atmospheres, or not more than about 1.5 atmospheres.

Carbon dioxide is flashed from the first treated solvent in the second stage flash apparatus 120 to yield a second treated solvent having a third carbon dioxide content that is lower than the second carbon dioxide content, and a second carbon dioxide-containing gas stream. The second carbon dioxide-containing gas stream 122 exits the second stage flash apparatus 120 and is fed to a condenser 124 that condenses the water vapor and separates it from the carbon dioxide gas. The carbon dioxide gas stream 126 exits the condenser 124 and is fed to the first compression stage of a multi-stage compression train as explained below. The condensed water stream 128 exits the condenser 124 and is added to the second treated solvent steam 130 after the stream 130 exits the second stage flash apparatus 120 and passes through the cross-exchanger 106 and cooler 125. The second treated solvent stream 130, with the condensed water stream 128 added to it, becomes stream 131 and can then be transferred using solvent pump 132 to form stream 133 for reuse in a carbon dioxide absorption process, or another suitable application.

Alternatively, but not required, the second treated solvent stream 130 can be fed to a third stage flash apparatus whose structure and operation mimics that of the second stage flash apparatus 120, and can be described with corresponding reference numerals. Similarly, the treated solvent steam exiting the third stage flash apparatus can be fed to fourth and subsequent flash apparatus, as desired, to reduce the carbon dioxide content to very low levels. The process would then include the steps of flashing carbon dioxide from the second treated solvent in the third stage flash apparatus 120 to yield a third treated solvent having a fourth carbon dioxide content that is lower than the third carbon dioxide content and a third carbon dioxide-containing gas stream; removing the third carbon dioxide-containing gas stream from the third stage flash apparatus; and recovering the third treated solvent from the third stage flash apparatus. The third treated solvent would then be fed to the fourth stage flash apparatus having the same configuration 120. The process would then include the steps of feeding the third treated solvent to the fourth stage flash apparatus; flashing carbon dioxide from the third treated solvent in the fourth stage flash apparatus to yield a fourth treated solvent having a fifth carbon dioxide content that is lower than the fourth carbon dioxide content and a fourth carbon dioxide-containing gas stream; removing the fourth carbon dioxide-containing gas stream from the fourth stage flash apparatus; and recovering the fourth treated solvent from the fourth stage flash apparatus.

The second stage flash apparatus 120 can be a standard flash tank or another suitable flash apparatus. The second treated solvent has a third carbon dioxide content that is lower than the second carbon dioxide content and is suitably at least about 30% lower, or at least about 50% lower, or at least about 90% lower than the second carbon dioxide content. For example, when the second carbon dioxide content about 2-6% by weight, the third carbon dioxide content can be not more than about 4.0% by weight, or not more than about 1% by weight or not more than about 0.2% by weight.

Figure 2:
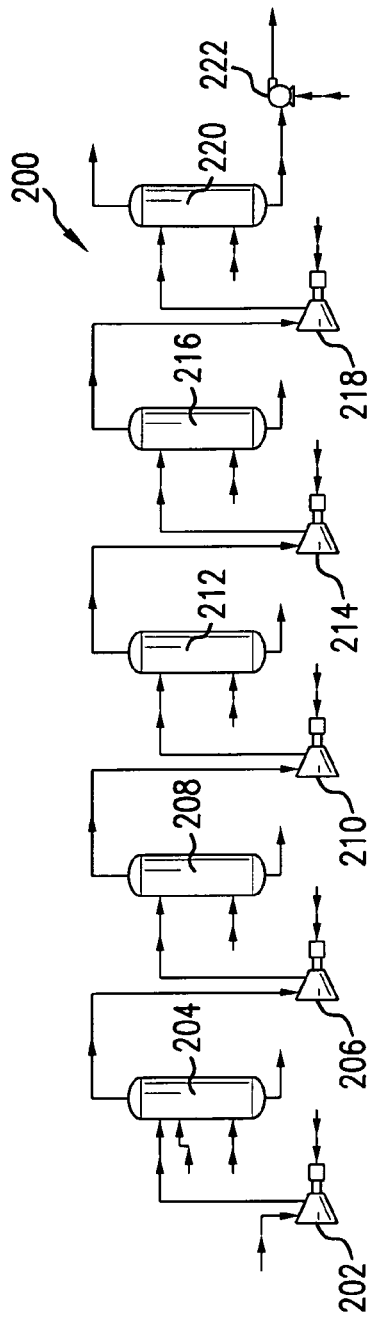
FIG. 2 schematically illustrates a multi-stage compression train used to compress and liquefy carbon dioxide generated by the two-stage solvent regeneration process.

FIG. 2 shows a HYSYS® model of a six-stage compression train 200 that is used for compressing the recovered carbon dioxide (for example, streams 114 and 126, FIG. 1) to a higher pressure or a liquid state. The compression train 200 includes a first stage compression pump 202, suitably a piston pump, a first stage cooler 204, a second stage compression pump 206, a second stage cooler 208, a third stage compression pump 210, a third stage cooler 212, a fourth stage compression pump 214, a fourth stage cooler 216, a fifth stage compression pump 218, a fifth stage cooler 220, and a sixth stage compression pump 222. The compression pumps 202, 206, 210, 214, 218 and 222 compress the carbon dioxide in stages from a starting pressure corresponding to the pressure of carbon dioxide streams 114, 126 (FIG. 1) to a liquification pressure sufficient to maintain the carbon dioxide in a completely liquid state, for example, about 150 atmospheres or 2200 psia). The coolers 204, 208, 212, 216 and 220 cool the compressed carbon dioxide at each stage, suitably to about ambient temperature.

The carbon dioxide stream 114 (FIG. 1) originating from the first stage flash apparatus 108 typically has a pressure similar to the suction-side pressure of the second or third stage of a multi-stage compression train, suitably at least about six atmospheres, or at least about eight atmospheres, or at least about ten atmospheres, and a temperature at or slightly above ambient due to the condenser 112. Because the carbon dioxide stream 114 already has a significantly higher pressure than the first stage suction-side pressure of a multi-stage compression train, it does not need to enter the compression train 200 at the first sage compression pump 210, but can instead enter at the second stage compression pump 214 and/or the third stage compression pump 218. This results in significant energy savings and cost savings compared to prior art carbon dioxide recovery processes, which require feeding the entire amount of carbon dioxide to the first stage compression pump 202, typically not more than 2 atmospheres, suitably not more than 1.5 atmospheres.

The carbon dioxide stream 126 originating from the second stage flash apparatus 120 typically has a pressure similar to the second pressure described above, typically not more than 2 atmospheres, suitably not more than 1.5 atmospheres, and a temperature at or slightly above ambient due to the condenser 124. Because of its lower pressure, the carbon dioxide stream 126 can suitably be introduced to the compression train 200 at the first stage compression pump 202. However, because the carbon dioxide stream 126 represents only a fraction of the total carbon dioxide entering the compression train 200 from streams 114 and 126, the overall energy and cost savings are significant compared to conventional carbon dioxide recovery processes that feed all of the recovered carbon dioxide into the first stage of the compression train. In practice, the amount of carbon dioxide generated from the stream 126 from the second stage flash apparatus 120 can range from about 20-60% of the total carbon dioxide, and the amount of carbon dioxide generated from the stream 114 from the first stage flash apparatus 108 can range from about 30-80% of the total.

EXAMPLES

Using the two-stage flash regeneration process illustrated in FIG. 1 and the six stage compression train illustrated in FIG. 2, carbon dioxide was removed from an aMDEA solvent containing 8% by weight of an activating agent and having an initial carbon dioxide loading of 5 to 8% by weight. The carbon dioxide-loaded solvent was fed to the first stage flash apparatus, a once-through reboiler at three sets of temperature and pressure conditions: 1) 140° C. and 8.16 atmospheres, 2) 130° C. and 6.8 atmospheres, and 3) 120° C. and 5.44 atmospheres. For each run, the recovered carbon dioxide was compressed and liquefied using the illustrated compression train (FIG. 2). The carbon dioxide generated from the first stage once-through reboiler was fed to the second or third stage of the compression train. The carbon dioxide generated from the second stage flash tank was fed to the first stage of the compression train. The power required for the overall compression was recorded, and was compared to the power required to compress and liquefy a corresponding amount of carbon dioxide generated from a conventional desorption column and fed entirely to the first stage of the compression train.

The HYSIS® modeling results are shown in Table 1. As shown, the higher the first temperature and first pressure of carbon dioxide-loaded solvent entering the first stage reboiler, the greater the savings in power required for compression, compared to the carbon dioxide generated from the conventional desorption column.

TABLE 1

| Example | Temperature ° C. | Pressure, Atm. | % $CO_2$ to Compression Stages | | | % Power Reduction Versus Control |
|---|---|---|---|---|---|---|
| | | | $3^{rd}$ Stage | $2^{nd}$ Stage | $1^{st}$ Stage | |
| 1 | 140 | 8.16 | 50.3 | 0 | 49.7 | 20.1 |
| 2 | 130 | 6.80 | 0 | 66.7 | 33.3 | 12.6 |
| 3 | 120 | 5.44 | 0 | 50.7 | 49.3 | 9.6 |
| Control | 120 | 1.36 | 0 | 0 | 100 | 0 |

The embodiments of the invention described herein are presently preferred. Various modifications and improvements can be made without departing from the spirit and scope of the invention. The scope of the invention is defined by the appended claims, and all changes that fall within the meaning and range of equivalents are intended to be embraced therein.

We claim:

1. A process for removing carbon dioxide from a carbon dioxide-loaded solvent having a first carbon dioxide content, comprising the steps of:
    applying a first pressure of at least about four atmospheres and no more than 10 atmospheres to the carbon dioxide-loaded solvent and heating the carbon dioxide-loaded solvent to a first temperature;
    feeding the carbon dioxide-loaded solvent to a first stage flash apparatus;
    flashing carbon dioxide from the carbon dioxide-loaded solvent in the first stage flash apparatus to yield a first treated solvent having a second carbon dioxide content that is lower than the first carbon dioxide content and a first carbon dioxide-containing gas stream;
    removing the first carbon dioxide-containing gas stream from the first stage flash apparatus;
    feeding the first treated solvent to a second stage flash apparatus at a second temperature that is lower than the first temperature and a second pressure that is lower than the first pressure;
    flashing carbon dioxide from the first treated solvent in the second stage flash apparatus to yield a second treated solvent having a third carbon dioxide content that is lower than the second carbon dioxide content, and a second carbon dioxide-containing gas stream;
    removing the second carbon dioxide-containing gas stream from the second stage flash apparatus; and
    recovering the second treated solvent from the second stage flash apparatus.

2. The process of claim 1, wherein the first temperature is at least about 125° C.

3. The process of claim 1, wherein the first temperature is at least about 135° C. and the first pressure is at least about eight atmospheres.

4. The process of claim 1, wherein the second temperature is not more than about 120° C. and the second pressure is not more than about three atmospheres.

5. The process of claim 1, wherein the second temperature is not more than about 110° C. and the second pressure is not more than about 1.5 atmospheres.

6. The process of claim 1, wherein the first carbon dioxide content is at least about 8% by weight.

7. The process of claim 1, wherein the second carbon dioxide content is not more than about 6% by weight.

8. The process of claim 1, wherein the third carbon dioxide content is not more than about 4% by weight.

9. The process of claim 1, wherein the first stage flash apparatus comprises a reboiler.

10. The process of claim 1, wherein the second stage flash apparatus comprises a flash tank.

11. The process of claim 1, wherein the carbon dioxide-loaded solvent comprises a solvent selected from the group consisting of aqueous ammonia, amine-based solvents, aqueous potassium carbonate, and combinations thereof.

12. The process of claim 1, wherein the carbon dioxide-loaded solvent comprises activated N-methyl diethanolamine.

13. A process for removing carbon dioxide from a carbon dioxide-loaded solvent having a first carbon dioxide content, comprising the steps of:
heating the carbon dioxide-loaded solvent to a first temperature of at least about 125° C. and creating a first pressure of at least about four atmospheres and no more than 10 atmospheres;
feeding the carbon dioxide-loaded solvent to a first stage reboiler;
flashing carbon dioxide from the carbon dioxide-loaded solvent in the first stage reboiler to yield a first treated solvent having a second carbon dioxide content that is lower than the first carbon dioxide content and a first carbon dioxide-containing gas stream;
removing the first carbon dioxide-containing gas stream from the first stage reboiler;
feeding the first treated solvent to a second stage flash tank at a second temperature that is not more than about 120° C. and a second pressure that is at least about 40% less than the first pressure;
flashing carbon dioxide from the first treated solvent in the second stage flash tank to yield a second treated solvent having a third carbon dioxide content that is lower than the second carbon dioxide content and a second carbon dioxide-containing gas stream;
removing the second carbon dioxide-containing gas stream from the second stage flash tank; and
recovering the second treated solvent from the second stage flash tank.

14. The process of claim 13, wherein the first temperature is at least about 135° C. and the first pressure is at least about eight atmospheres.

15. The process of claim 13, wherein the second temperature is not more than about 110° C. and the second pressure is not more than about three atmospheres.

16. The process of claim 13, further comprising the steps of:
feeding the first carbon dioxide-containing gas stream to the second stage of a multi-stage compression train;
feeding the second carbon dioxide-containing gas stream to the first stage of the multi-stage compression train; and
compressing the first and second carbon dioxide-containing gas streams.

17. The process of claim 13, further comprising the steps of:
feeding the first carbon dioxide-containing gas stream to the third stage of a multi-stage compression train;
feeding the second carbon dioxide-containing gas stream to the first stage of the multi-stage compression train; and
compressing the first and second carbon dioxide-containing gas streams.

18. A process for removing carbon dioxide from a carbon dioxide-loaded solvent having a first carbon dioxide content, comprising the steps of:
flashing carbon dioxide from the carbon dioxide-loaded solvent in a first stage flash apparatus to yield a first treated solvent having a second carbon dioxide content that is lower than the first carbon dioxide content and a first carbon dioxide-containing gas stream, wherein the first carbon dioxide-containing stream is at a pressure of at least six atmospheres and at a temperature at or slightly above ambient; and
flashing carbon dioxide from the first treated solvent in a second stage flash apparatus to yield a second treated solvent having a third carbon dioxide content that is lower than the second carbon dioxide content and a second carbon dioxide-containing gas stream.

19. The process of claim 18, further comprising the step of:
feeding the first carbon dioxide-containing gas stream to the second stage of a multi-stage compression train;
feeding the second carbon dioxide-containing gas stream to the first stage of the multi-stage compression train; and
compressing the first and second carbon dioxide-containing gas streams.

20. The process of claim 18, further comprising the steps of:
feeding the first carbon dioxide-containing gas stream to the third stage of a multi-stage compression train;
feeding the second carbon dioxide-containing gas stream to the first stage of the multi-stage compression train; and
compressing the first and second carbon dioxide-containing gas streams.

* * * * *